United States Patent
Li et al.

(10) Patent No.: US 11,914,917 B2
(45) Date of Patent: Feb. 27, 2024

(54) TILED DISPLAY APPARATUS, TILED DISPLAY CONTROL METHOD, AND NON-TRANSITORY COMPUTER-READABLE STORAGE MEDIUM

(71) Applicants: BEIJING BOE DISPLAY TECHNOLOGY CO., LTD., Beijing (CN); BOE TECHNOLOGY GROUP CO., LTD., Beijing (CN)

(72) Inventors: Shou Li, Beijing (CN); Enliang Zhang, Beijing (CN); Jiakun Qi, Beijing (CN); Zhankun Meng, Beijing (CN); Hengyu Yan, Beijing (CN); Junning Su, Beijing (CN); Hanzhang Niu, Beijing (CN)

(73) Assignees: BEIJING BOE DISPLAY TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 66 days.

(21) Appl. No.: 17/770,036

(22) PCT Filed: Apr. 8, 2021

(86) PCT No.: PCT/CN2021/086022
§ 371 (c)(1),
(2) Date: Apr. 18, 2022

(87) PCT Pub. No.: WO2021/227720
PCT Pub. Date: Nov. 18, 2021

(65) Prior Publication Data
US 2022/0365738 A1 Nov. 17, 2022

(30) Foreign Application Priority Data
May 15, 2020 (CN) .......................... 202010415373.0

(51) Int. Cl.
*G06F 3/14* (2006.01)
*G09G 3/32* (2016.01)

(52) U.S. Cl.
CPC .......... *G06F 3/1438* (2013.01); *G06F 3/1446* (2013.01); *G09G 3/32* (2013.01); *G09G 2300/026* (2013.01)

(58) Field of Classification Search
CPC .... G06F 3/1438; G06F 3/1446; G06F 3/1431; G09G 3/32; G09G 2300/026;
(Continued)

(56) References Cited

U.S. PATENT DOCUMENTS 6,243,858 B1 * 6/2001 Mizoguchi ................ G06F 8/20
717/109
10,403,237 B2 * 9/2019 Chen ..................... G06F 3/1423
(Continued)

FOREIGN PATENT DOCUMENTS

| CN | 103226918 A | 7/2013 |
| CN | 104092969 A | 10/2014 |

(Continued)

OTHER PUBLICATIONS

First Office Action for Chinese Patent Application No. 202010415373.0 issued by the Chinese Patent Office dated Apr. 14, 2023.

*Primary Examiner* — Vijay Shankar
(74) *Attorney, Agent, or Firm* — IP & T GROUP LLP

(57) ABSTRACT

A tiled display apparatus includes a main display driving board and display modules. Each display module includes a system board. The main display driving board is coupled to a first stage system board. The main display driving board is configured to receive a display signal, acquire a main screen region display signal, and transmit the main screen region display signal to the first stage system board. The system board is configured to receive the main screen region display
(Continued)

signal, and extract a group of main screen region display data corresponding thereto from the main screen region display signal to control a display module to which the system board belongs to display an image according to the main screen region display data. Except for a last stage system board, remaining system boards are each further configured to transmit the received main screen region display signal to a next stage system board.

19 Claims, 7 Drawing Sheets

(58) Field of Classification Search
CPC ............ G09G 2300/0421; G09G 3/36; G09G 2300/0439; G09G 2310/0232; G09G 2360/04; G09G 2360/08
See application file for complete search history.

(56) References Cited

U.S. PATENT DOCUMENTS

| | | | |
|---|---|---|---|
| 11,115,701 B2* | 9/2021 | Depies | G10L 15/26 |
| 2002/0140629 A1 | 10/2002 | Sundahl | |
| 2006/0044215 A1* | 3/2006 | Brody | H10K 59/131 |
| | | | 345/1.3 |
| 2018/0182840 A1 | 6/2018 | Lin | |

FOREIGN PATENT DOCUMENTS

| CN | 108279857 A | 7/2018 |
|---|---|---|
| CN | 110716661 A | 1/2020 |
| CN | 111506284 A | 8/2020 |

* cited by examiner

TILED DISPLAY APPARATUS, TILED DISPLAY CONTROL METHOD, AND NON-TRANSITORY COMPUTER-READABLE STORAGE MEDIUM

CROSS-REFERENCE TO RELATED APPLICATIONS

The present disclosure is a national phase entry under 35 USC 371 of International Patent Application No. PCT/CN2021/086022 filed on Apr. 8, 2021, which claims priority to Chinese Patent Application No. 202010415373.0, filed on May 15, 2020, which are incorporated herein by reference in their entirety.

TECHNICAL FIELD

The present disclosure relates to the field of display technologies, and in particular, to a tiled display apparatus, a tiled display control method and a non-transitory computer-readable storage medium.

BACKGROUND

At present, tiled display apparatus are widely used in various industries. The existing tiled display apparatus includes a plurality of display modules that are tiled together, and each display module needs to be separately provided with a display driving board. When the tiled display apparatus works, a signal source sends a display signal to the display driving board corresponding to each display module at the same time, and each display driving board controls the display module corresponding thereto to display an image according to the received display signal, so that the entire tiled display apparatus displays a complete image.

The tiled display apparatus described above requires a large number of display driving boards, resulting in high costs. In addition, a plurality of display driving boards need to be provided with respective data lines to connect the signal source thereto, which causes the wiring to be messy and difficult to install.

SUMMARY

In one aspect, a tiled display apparatus is provided. The tiled display apparatus includes a main display driving board, and a plurality of display modules that are tiled together. Each display module includes a system board, and system boards of all display modules are cascaded in sequence. The main display driving board is coupled to a first stage system board among the system boards cascaded in sequence.

The main display driving board is configured to receive a display signal, acquire a main screen region display signal according to the display signal, and transmit the main screen region display signal to the first stage system board. The main screen region display signal includes a plurality of groups of main screen region display data, and a group of main screen region display data is display data required for a display module to display an image. The system board is configured to receive the main screen region display signal, extract a group of main screen region display data corresponding to the system board from the main screen region display signal to control a display module to which the system board belongs to display an image according to the extracted main screen region display data. Except for a last stage system board, remaining system boards are each further configured to transmit the received main screen region display signal to a next stage system board.

In some embodiments, the main display driving board is further configured to divide the display signal according to a number of the plurality of system boards, so as to obtain the main screen region display signal including the plurality of groups of main screen region display data.

In some embodiments, the tiled display apparatus further includes a plurality of seam display units. Each seam display unit is disposed between two adjacent display modules. The plurality of seam display units include at least one first seam display unit. The main display driving board is coupled to the at least one first seam display unit. The main display driving board is further configured to acquire at least one first seam region display signal according to the display signal, and transmit the at least one first seam region display signal to the at least one first seam display unit, respectively. Each first seam region display signal includes a group of first seam region display data, and a group of first seam region display data is display data required for a first seam display unit to display an image. Each first seam display unit is configured to receive a first seam region display signal to display an image according to a group of first seam region display data included in the first seam region display signal.

In some embodiments, the plurality of seam display units further include at least one second seam display unit. The tiled display apparatus further includes at least one secondary display driving board. The at least one secondary display driving board is coupled to the main display driving board, and each secondary display driving board is coupled to one or more second seam display units.

The main display driving board is further configured to acquire at least one second seam region display signal according to the display signal, and transmit the at least one second seam region display signal to the at least one secondary display driving board, respectively. Each second seam region display signal includes at least one group of second seam region display data, and a group of second seam region display data is display data required for a second seam display unit to display an image. Each secondary display driving board is configured to receive a second seam region display signal and transmit at least one group of second seam region display data included in the second seam region display signal to one or more second seam display units coupled thereto, respectively. Each second seam display unit is configured to receive a group of second seam region display signal to display an image according to the group of second seam region display data.

In some embodiments, the first seam display unit is closer to the main display driving board than the second seam display unit.

In some embodiments, a number of first seam display units is less than or equal to seven. A number of second seam display units coupled to the secondary display driving board is less than or equal to seven.

In some embodiments, the seam display units are mini light-emitting diode (LED) display units.

In some embodiments, the main display driving board is disposed on a display module to which the first stage system board belongs.

In some embodiments, the tiled display apparatus further includes at least one secondary display driving board, and each secondary display driving board is disposed on any one of display modules adjacent to at least one second seam display unit, which is coupled to the secondary display driving board.

In some embodiments, the main display driving board includes a display signal input interface, and a first output interface that is coupled to the first stage system board. The display signal input interface is configured to receive the display signal. The first output interface is configured to transmit the main screen region display signal acquired according to the display signal to the first stage system board.

In some embodiments, the tiled display apparatus further includes at least one first seam display unit, at least one second seam display unit and at least one secondary display driving board, and the main display driving board further includes at least one second output interface and at least one third output interface. The at least one second output interface is respectively coupled to the at least one first seam display unit. A second output interface is configured to transmit a first seam region display signal acquired according to the display signal to a first seam display unit coupled thereto. The at least one third output interface is respectively coupled to the at least one secondary display driving board. A third output interface is configured to transmit a second seam region display signal acquired according to the display signal to a secondary display driving board coupled thereto.

In some embodiments, each display module further includes a timing controller. The timing controller is coupled to the system board. The system board is configured to output a timing control signal and a red-green-blue (RGB) data signal according to the extracted main screen region display data. The timing controller is configured to receive the timing control signal and the RGB data signal, and control the display module to display an image according to the timing control signal and the RGB data signal.

In some embodiments, the tiled display apparatus further includes a first power circuit. The first power circuit is coupled to the main display driving board, and the first power circuit is configured to provide power to the main display driving board.

In some embodiments, each display module further includes a second power circuit. The second power circuit is coupled to the system board, and the second power circuit is configured to provide power to the system board coupled thereto.

In some embodiments, the tiled display apparatus further includes at least one secondary display driving board, and the tiled display apparatus further includes at least one third power circuit. The at least one third power circuit is respectively coupled to the at least one secondary display driving board, and a third power circuit is configured to provide power to a secondary display driving board coupled thereto.

In another aspect, a tiled display control method applied to the tiled display apparatus as described above is provided. The tiled display control method includes: receiving, by the main display driving board of the tiled display apparatus, the display signal; acquiring, by the main display driving board, the main screen region display signal according to the display signal; and transmitting, by the main display driving board, the main screen region display signal to the first stage system board among system boards of display modules of the tiled display apparatus, the main screen region display signal including the plurality of groups of main screen region display data, and the group of main screen region display data being display data required for the display module to display an image; receiving, by the first stage system board, the main screen region display signal transmitted by the main display driving board; transmitting, by each of remaining system boards except for a last stage system board, the received main screen region display signal to a next stage system board; receiving, by each of remaining system boards except for the first stage system board, the main screen region display signal transmitted by a previous stage system board; and extracting, by each system board, a group of main screen region display data corresponding to the system board from the received main screen region display signal, respectively to control a corresponding display module to display an image according to the extracted group of main screen region display data.

In some embodiments, the tiled display apparatus further includes a plurality of seam display units. The plurality of seam display units include at least one first seam display unit. The tiled display control method further includes: acquiring, by the main display driving board, at least one first seam region display signal according to the display signal; and transmitting, by the main display driving board, the at least one first seam region display signal to the at least one first seam display unit coupled thereto, respectively, each first seam region display signal including a group of first seam region display data, and a group of first seam region display data being display data required for a first seam display unit to display an image; receiving, by each first seam display unit, a first seam region display signal to display an image according to a group of first seam region display data included in the first seam region display signal.

In some embodiments, the plurality of seam display units further include at least one second seam display unit, and the tiled display apparatus further includes at least one secondary display driving board. The tiled display control method further includes: acquiring, by the main display driving board, at least one second seam region display signal according to the display signal; and transmitting, by the main display driving board, the at least one second seam region display signal to the at least one secondary display driving board, respectively, each second seam region display signal including at least one group of second seam region display data, and a group of second seam region display data being display data required for a second seam display unit to display an image; receiving, by each secondary display driving board, a second seam region display signal; and transmitting, by the secondary display driving board, at least one group of second seam region display data included in the second seam region display signal to at least one second seam display unit coupled thereto, respectively; and receiving, by each second seam display unit, a group of second seam region display data to display an image according to the group of second seam region display data.

In some embodiments, acquiring, by the main display driving board, the main screen region display signal according to the display signal, includes: dividing, by the main display driving board, the display signal according to the number of the plurality of system boards, so as to obtain the main screen region display signal including the plurality of groups of main screen region display data.

In yet another aspect, a non-transitory computer-readable storage medium is provided. The computer-readable storage medium has stored thereon computer program instructions that, when executed on a processor, cause the processor to perform one or more steps of the tiled display control method according to any of the above embodiments.

BRIEF DESCRIPTION OF THE DRAWINGS

In order to describe technical solutions in the present disclosure more clearly, the accompanying drawings to be used in some embodiments of the present disclosure will be introduced briefly below. Obviously, the accompanying drawings to be described below are merely accompanying drawings of some embodiments of the present disclosure, and a person of ordinary skill in the art can obtain other drawings according to these drawings. In addition, the accompanying drawings in the following description may be regarded as schematic diagrams, and are not limitations on actual sizes of products, actual processes of methods and actual timings of signals involved in the embodiments of the present disclosure.

DETAILED DESCRIPTION

Figure 1:
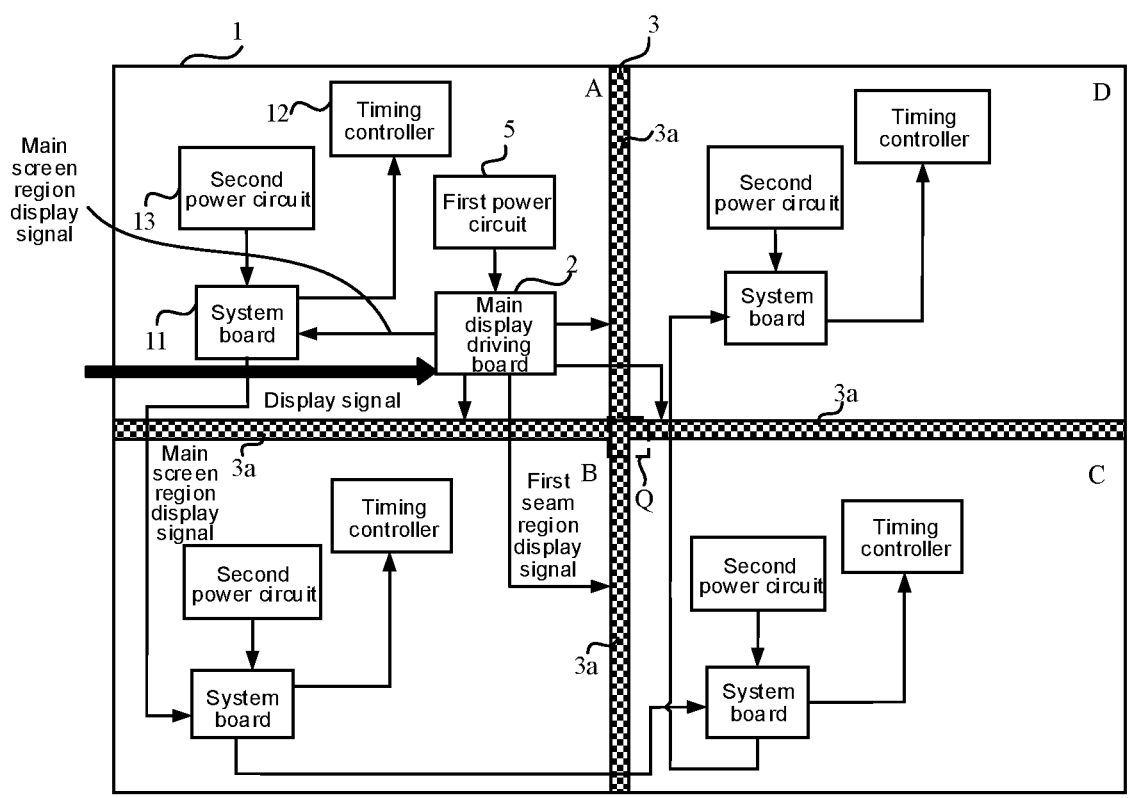
FIG. 1 is a structural diagram of a tiled display apparatus, in accordance with some embodiments.

Technical solutions in some embodiments of the present disclosure will be described clearly and completely below with reference to the accompanying drawings. Obviously, the described embodiments are merely some but not all embodiments of the present disclosure. All other embodiments obtained on a basis of the embodiments of the present disclosure by a person of ordinary skill in the art shall be included in the protection scope of the present disclosure.

Unless the context requires otherwise, throughout the description and the claims, the term "comprise" and other forms thereof such as the third-person singular form "comprises" and the present participle form "comprising" are construed as an open and inclusive meaning, i.e., "including, but not limited to." In the description of the specification, the terms such as "one embodiment", "some embodiments", "exemplary embodiments", "example", "specific example" or "some examples" are intended to indicate that specific features, structures, materials or characteristics related to the embodiment(s) or example(s) are included in at least one embodiment or example of the present disclosure. Schematic representations of the above terms do not necessarily refer to the same embodiment(s) or example(s). In addition, the specific features, structures, materials, or characteristics may be included in any one or more embodiments or examples in any suitable manner.

Below, the terms "first" and "second" are only used for descriptive purposes, and are not to be construed as indicating or implying the relative importance or implicitly indicating the number of indicated technical features. Thus, a feature defined with "first" or "second" may explicitly or implicitly include one or more of the features. In the description of the embodiments of the present disclosure, the term "a plurality of/the plurality of" means two or more unless otherwise specified.

In the description of some embodiments, the terms "coupled", "connected" and derivatives thereof may be used. For example, the term "connected" may be used in the description of some embodiments to indicate that two or more elements are in direct physical or electrical contact with each other. For another example, the term "coupled" may be used in the description of some embodiments to indicate that two or more components are in direct physical or electrical contact. However, the term "coupled" or "communicatively coupled" may also mean that two or more components are not in direct contact with each other, but still cooperate or interact with each other. The embodiments disclosed herein are not necessarily limited to the content herein.

The use of "applicable to" or "configured to" herein indicates an open and inclusive expression, which does not exclude devices applicable to or configured to perform additional tasks or steps.

In the related art, a tiled display apparatus includes a plurality of display driving boards and a plurality of display modules. The plurality of display modules are tiled together, and each display module needs to be separately provided with a display driving board. When the tiled display apparatus works, a signal source sends a display signal to the display driving board corresponding to each display module at the same time, and each display driving board extracts corresponding display data according to the received display signal, and controls the display module corresponding thereto to display an image, so that the entire tiled display apparatus displays a complete image.

In the tiled display apparatus described above, each display module corresponds to a single display driving board. In a case where the tiled display apparatus includes a large number of display modules (for example, the plurality of display modules form a 3*3 or 4*4 display module array), the tiled display apparatus requires a large number of display driving boards, resulting in high costs. In addition, the display driving boards need to be coupled to the signal source through respective data lines, which causes the wiring to be messy and difficult to install.

Figure 7A:
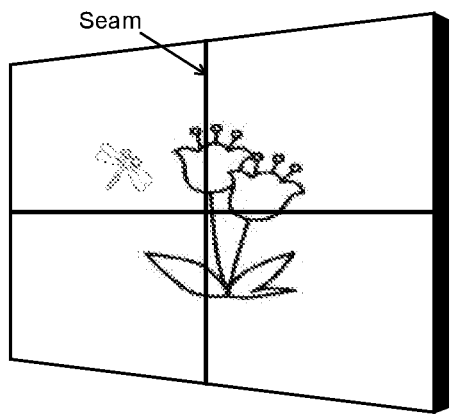
FIG. 7A is a diagram of display effect of a tiled display apparatus in the related art.

In the plurality of display modules tiled together included in the tiled display apparatus, due to the existence of frames, there will be a seam between two adjacent display modules. As a result, when the tiled display apparatus displays an image, there will be seams on the entire image displayed, causing the image to be discontinuous. For example, the displayed image is shown in FIG. 7A, and it may be seen that the black seams are quite obvious on the entire image displayed.

In the related art, light-emitting diode (LED) display units are used to block the seams, and each display driving board drives the LED display unit coupled thereto to display an image at the same time, so as to achieve a purpose of blocking the seams. However, since the pixel spacing of the display module does not match that of the LED display unit (for example, in a case where the display module is a liquid crystal display module, the pixel spacing of the LED display unit is greater than the pixel spacing of the liquid crystal display module), and the visual effects, such as brightness and color, of the images displayed by different types of display units are different, there may be problems such as inaccurate alignment and inconsistent visual effects when the display module and the LED display unit display images. Consequently, there may be significant visual differences in the seams of the entire image displayed, which affects the display effect.

Figure 2:
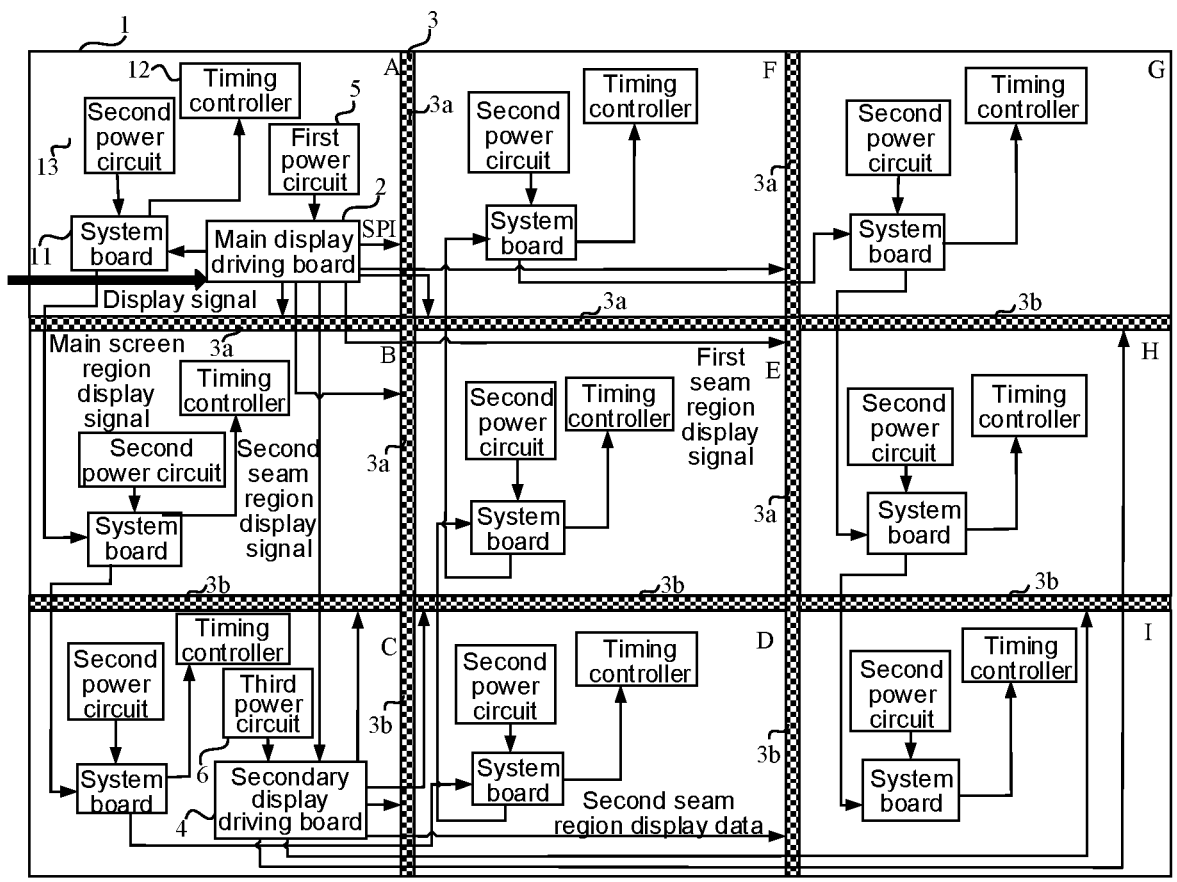
FIG. 2 is a structural diagram of another tiled display apparatus, in accordance with some embodiments.
Figure 3:
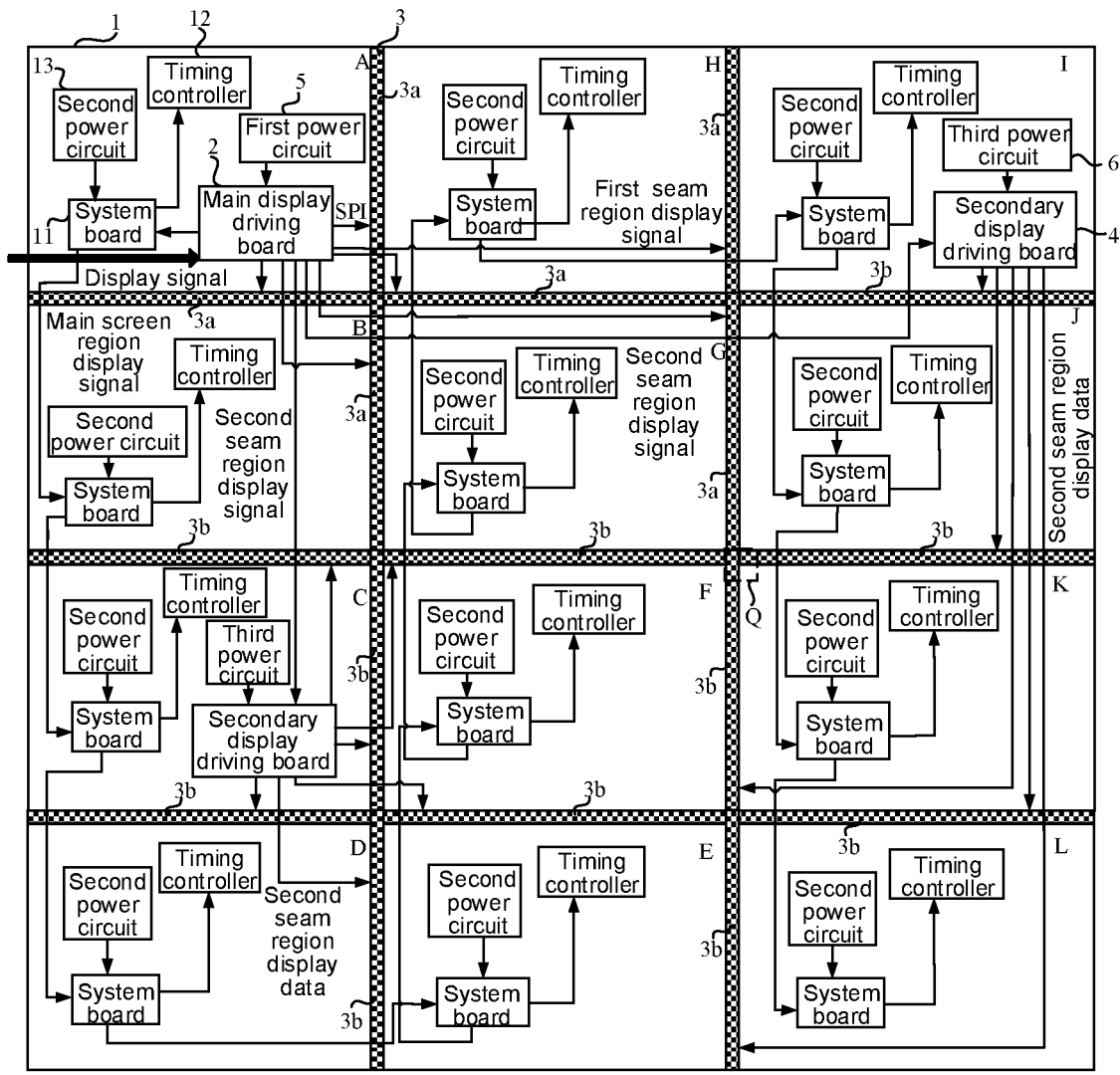
FIG. 3 is a structural diagram of yet another tiled display apparatus, in accordance with some embodiments.

As shown in FIGS. 1 to 3, some embodiments of the present disclosure provide a tiled display apparatus, which includes a main display driving board 2 and a plurality of display modules 1 that are tiled together.

Each display module 1 includes a system board 11. System boards 11 of all display modules 1 are cascaded in sequence.

As shown in FIG. 1, the tiled display apparatus includes four display modules 1 that are tiled together, which are numbered "A", "B", "C" and "D" in sequence. The system boards 11 of the display modules 1 are cascaded in sequence in the order from A to D.

For example, the display module 1 is a liquid crystal display module, and the liquid crystal display module includes the system board 11, a driving circuit, a backlight module and a display screen. The system board 11 is equivalent to a main board of the entire display module 1, and the system board 11 is configured to output a signal required for a display screen to display an image to the driving circuit, so that the driving circuit controls the display screen to display the image according to the received signal.

The main display driving board 2 is coupled to a first stage system board 11 among a plurality of system boards 11 cascaded in sequence. As shown in FIG. 1, the main display driving board 2 is coupled to the system board 11 included in the display module 1 numbered "A".

The main display driving board 2 is configured to receive a display signal, acquire a main screen region display signal according to the display signal, and transmit the main screen region display signal to the system board 11 coupled thereto. The main screen region display signal includes a plurality of groups of main screen region display to data, and a group of main screen region display data is display data required for a display module to display an image.

In the tiled display apparatus, the main display driving board 2 has functions of signal reception and signal distribution. The main display driving board 2 receives the display signal from a signal source, acquires the main screen region display signal according to the display signal, and transmits the main screen region display signal to the system board 11 coupled thereto. In some embodiments, the main display driving board 2 is configured to divide the display signal according to the number of the plurality of system boards 11, so as to obtain the main screen region display signal including the plurality of groups of main screen region display data.

For example, the main display driving board 2 is a field-programmable gate array (FPGA) driving board. A tiling processing unit is integrated on the FPGA driving board, so that the tiling processing unit may divide a display signal into the main screen region display signal according to the number of the plurality of display modules 1. The main screen region display signal includes a plurality of groups of main screen region display data, and a group of display data correspondingly controls a display module 1 to display an image.

For example, the signal source is a 4K player or a computer, which outputs a corresponding display signal according to a video or image that needs to be displayed. For example, the display signal is a high-definition multimedia interface (HDMI)-4K video signal.

The system board 11 is configured to receive the main screen region display signal, extract a group of main screen region display data corresponding to the system board 11 from the main screen region display signal to control the display module 1 to which the system board 11 belongs to display an image according to the extracted main screen region display data. Except for a last stage system board 11, remaining system boards 11 are each further configured to transmit the received main screen region display signal to a next stage system board 11.

For example, the system board 11 is a system-on-chip (SOC) development board, and the system board 11 includes an application-specific integrated circuit (ASIC). With a complete system and all content of embedded software, the ASIC may be able to extract the main screen region display data corresponding to the system board 11 from the main screen region display signal to control the display module 1 to which the system board 11 belongs to display an image according to the extracted main screen region display data.

The system board 11 has the functions of extracting corresponding main screen region display data and transmitting the main screen region display signal. After receiving the main screen region display signal, each stage system board 11 controls the display module 1 to which it belongs to display an image according to the extracted main screen region display data. It will be noted that the rate at which the main screen region display signal is sequentially transmitted through the plurality of stages of system boards 11 is high enough that signal delay is negligible. That is to say, the plurality of display modules 1 display images simultaneously.

In the tiled display apparatus provided by some embodiments of the present disclosure, by connecting the system boards 11 included in all display modules 1 in cascade, and coupling the main display driving board 2 to the first stage system board 11, it may be possible to realize transmission of the main screen region display signal to the plurality of display modules 1 in sequence. In addition, the main display driving board 2 has the function of dividing the display signal, and the system board 11 has the function of extracting corresponding main screen region display data. As a result, each system board 11 controls the display module 1 to which it belongs to display an image according to the extracted main screen region display data, thereby realizing the display of a complete image. Therefore, in the tiled display apparatus of the embodiments of the present disclosure, the plurality of display modules 1 that are tiled together only need to be equipped with a single main display driving board 2. The system boards 1 transmit the main screen region display signal stage by stage and extract the corresponding main screen region display data under the control of the main display driving board 2, and each display module 1 displays an image under the control of the system board 11, thereby realizing image display on an entire tiled screen of the tiled display apparatus. In this way, the number of the main display driving boards 2 may be reduced, and thus the cost of the tiled display apparatus may be reduced.

Figure 4:
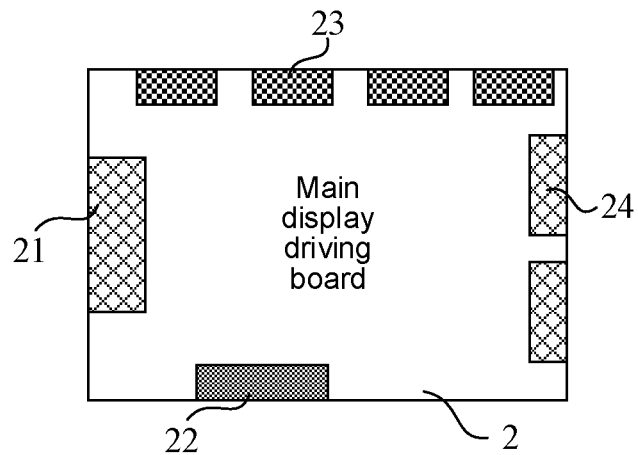
FIG. 4 is a structural diagram of a main display driving board of a tiled display apparatus, in accordance with some embodiments.

In some embodiments, as shown in FIG. 4, the main display driving board 2 includes a display signal input interface 21 and a first output interface 22.

The display signal input interface 21 is coupled to the signal source and is configured to receive the display signal. For example, the display signal input interface 21 is a HDMI.

The first output interface 22 is coupled to the first stage system board 11. The first output interface 22 is configured to transmit the main screen region display signal acquired according to the display signal to the first stage system board 11. For example, the first output interface is a HDMI.

In some embodiments, the system board 11 includes a main screen region display signal input interface. Except for the last stage system board 11, remaining system boards 11 each further includes a main screen region display signal output interface. The main screen region display signal input interface of the first stage system board 11 is coupled to the first output interface of the main display driving board 2, and the main screen region display signal input interface of the remaining system board 11 are each coupled to the main screen region output interface of a previous stage system board 11. The main screen region display signal output interface of the remaining system board 11 except for the last stage system board 11 is coupled to the main screen region display signal input interface of a next stage system board 11. For example, the main screen region display signal input interface and the main screen region display signal output interface are both HDMIs.

In some embodiments, as shown in FIGS. 1 to 3, the tiled display apparatus further includes a plurality of seam display units 3. Each seam display unit 3 is disposed between two adjacent display modules 1.

In order to block the seam between two adjacent display modules 1, the seam display unit 3 is disposed at the position of the seam, so as to achieve the purpose of improving the display effect. For example, in a case where the display module 1 is the liquid crystal display module, the display module 1 has a rather narrow frame, and there is a height difference between the frame and the display screen; in this case, the seam display unit is disposed at the position of the frames of two adjacent display modules. In this way, the surface of the display screen of the display module 1 and a surface of a display screen of the seam display unit are of the same height, so that the visual effect is good.

The plurality of seam display units 3 include at least one first seam display unit 3a. The main display driving board 1 is coupled to the at least one first seam display unit 3a.

As shown in FIG. 1, the plurality of seam display units 3 are all first seam display units 3a, and the tiled display apparatus includes four first seam display units 3a.

The main display driving board 2 further configured to acquire at least one first seam region display signal according to the display signal, and transmit the at least one first seam region display signal to the at least one first seam display unit 3a coupled thereto, respectively. Each first seam region display signal includes a group of first seam region display data, and the group of first seam region display data is display data required for a single first seam display unit 3a to display an image.

For example, the main display driving board 2 is further configured to divide the display signal according to the number of the plurality of first seam display units 3a, so as to obtain the at least one first seam region display signal.

Each first seam display unit 3a is configured to receive a first seam region display signal to display an image according to a group of first seam region display data included in the first seam region display signal.

The tiled display apparatus provided by the embodiments of the present disclosure further includes the at least one first seam display unit. The main display driving board 2 acquires the main screen region display signal and the at least one first seam region display signal simultaneously according to the display signal, and transmits the main screen region display signal to the first stage system board 11 and transmits the at least one first seam region display signal to the at least one first seam display unit 3a coupled thereto, respectively, at the same time. In this way, the plurality of display modules 1 and the at least one first seam display unit may display images simultaneously, thereby displaying an image at the tiled position of two adjacent display modules 1, realizing the display of a complete image on the entire tiled screen, and optimizing the display effect.

In some embodiments, the plurality of seam display units further include at least one second seam display unit 3b.

For example, as shown in FIG. 2, the number of display modules 1 included in the tiled display apparatus is nine. Therefore, the number of the plurality of seam display units 3 is twelve. The twelve seam display units 3 include six first seam display units 3a and six second seam display units 3b.

In this case, the tiled display apparatus further includes at least one secondary display driving board 4. The at least one secondary display driving board 4 is coupled to the main display driving board 2, and each secondary display driving board 4 is coupled to one or more second seam display units 3b.

In the above embodiments, in a case where the tiled display apparatus includes a large number of display modules 1 and seam display units 3 (for example, the tiled display apparatus includes more than six display modules 1 and more than seven seam display units), at least one secondary display driving board 4 may be provided in the tiled display apparatus, and the plurality of seam display units may be divided into a plurality of groups, and each group of seam display units respectively coupled to different display driving boards (including the main display driving board 2 and the secondary display driving board 4).

In some embodiments, as shown in FIGS. 2 and 3, among the plurality of seam display units 3 included in the tiled display apparatus, seam display units 3 coupled to the main display driving board 2 are grouped into a group, and are as first seam display units 31; the remaining seam display units are all used as second seam display units 32, and the second seam display units 32 are divided into at least one group, and each group of second seam display units 32 coupled to a single secondary display driving board 4. This arrangement enables allocation of a reasonable number of transmission interfaces to each display driving board, and allocation of a reasonable signal processing burden and signal transmission burden to each display driving board, thereby ensuring the normal operation of the tiled display apparatus.

For example, as shown in FIG. 2, in the case where the number of display modules 1 included in the tiled display apparatus is nine, and the number of the plurality of seam display units is twelve, the tiled display apparatus further includes a secondary display driving board 4, which is coupled to the main display driving board 2. The twelve seam display units include six first seam display units 3a and six second seam display units 3b. The six first seam display units 3a are grouped into a group, and are all coupled to the main display driving board 2; the six second seam display units 3b are grouped into a group, and are all coupled to the secondary display driving board 4.

For example, as shown in FIG. 3, in a case where the number of display modules 1 included in the tiled display apparatus is twelve, and the number of the plurality of seam display units is seventeen, the tiled display apparatus further includes two secondary display driving boards 4, which are both coupled to the main display driving board 2. The seventeen seam display units include six first seam display units 3a and eleven second seam display units 3b. The six first seam display units 3a are grouped into a group, and are all coupled to the main display driving board 2. In the eleven second seam display units 3b, six second seam display units 3b are grouped into a group, and are all coupled to a secondary display driving board 4 (which is located at the display module 1 numbered "C"); the remaining five second seam display units 3b are grouped into a group, and are all coupled to another secondary display driving board 4 (which is located at the display module 1 numbered "I").

The above are only two examples of the division mode of the plurality of first seam display units 3a and the plurality of second seam display units 3b in the tiled display apparatus, and the coupling relationship between the seam display units and the main display driving board 2 or the secondary display driving board 4. In practical applications, corresponding arrangements may be made according to specific requirements, which are not limited to the above two manners, and the present disclosure is not limited thereto.

The main display driving board 2 is further configured to acquire at least one second seam region display signal according to the display signal, and transmit the at least one second seam region display signal to the at least one secondary display driving board 4, respectively. Each second seam region display signal includes at least one group of second seam region display data, and a group of second seam region display data is display data required for a second seam display unit 3b to display an image.

Each secondary display driving board 4 is configured to receive a second seam region display signal and transmit at least one group of second seam region display data included in the second seam region display signal to one or more second seam display units 3b coupled thereto, respectively.

For example, the secondary display driving board 4 is a FPGA driving board. The FPGA driving board is integrated with a data allocation unit, so that the data allocation unit may transmit the at least one group of second seam region display data included in the received second seam region display signal to the at least one second seam region display unit 3b coupled to FPGA driving board, respectively.

Each second seam display unit 3b is configured to receive a group of second seam region display data to display an image according to the group of second seam region display data.

In some embodiments, as shown in FIG. 2, in the case where the number of display modules 1 included in the tiled display apparatus is nine, the tiled display apparatus includes one main display driving board 2 and one secondary display driving board 4. The secondary display driving board 4 is coupled to the main display driving board 2, and is further coupled to six second seam display units 3b.

In the tiled display apparatus, the main display driving board 2 acquires a second seam region display signal according to the display signal, and transmits the second seam region display signal to the secondary display driving board 4. The second seam region display signal includes six groups of second seam region display data, and a single group of second seam region display data is display data required for a single second seam display unit 3b to display an image. The secondary display driving board 4 receives the second seam region display signal, and transmits the six groups of second seam region display data included in the second seam region display signal to the six seam display units 3b coupled thereto, respectively. The second seam display unit 3b receives the second seam region display data to display an image according to the second seam region display data.

In some other embodiments, as shown in FIG. 3, in the case where the number of display modules 1 included in the tiled display apparatus is twelve, the tiled display apparatus includes one main display driving board 2 and two secondary display driving boards 4. The two secondary display driving boards 4 are coupled to the main display driving board 2; of the two secondary display driving boards 4, one secondary display driving board 4 (located at the display module 1 numbered "C") is further coupled to six second seam display units 3b, and the other secondary display driving board 4 (located at the display module 1 numbered "I") is further coupled to the remaining five second seam display units 3b.

In the tiled display apparatus, the main display driving board 2 acquires two second seam region display signals according to the display signal, and transmits the two second seam region display signals to the two secondary display driving boards 4, respectively. Of the two second seam region display signals, one second seam region display signal includes six groups of second seam region display data, and the other second seam region display signal includes five groups of second seam region display data, a single group of second seam region display data being display data required for a single second seam display unit 3b to display an image. Of the two secondary display driving boards 4, one secondary display driving board 4 (located at the display module 1 numbered "C") receives the second seam region display signal including the six groups of second seam region display data, and transmits the six groups of second seam region display data included in the second seam region display signal to the six seam display units 3b coupled thereto, respectively; the other secondary display driving board 4 (located at the display module 1 number "I") receives the second seam region display signal including the five groups of second seam region display data, and transmits the five groups of second seam region display data included in the second seam region display signal to the five seam display units 3b coupled thereto, respectively. The second seam display unit 3b receives the second seam region display data to display an image according to the second seam region display data.

The tiled display apparatus provided by the embodiments of the present disclosure includes a plurality of display modules 1 and a plurality of seam display units 3. In this case, the main display driving board 2 acquires the main screen region display signal, the at least one first seam region display signal and the at least one second seam region display signal simultaneously according to the display signal, and transmits the main screen region display signal to the first stage system board 11, transmits the at least one first seam region display signal to the at least one first seam display unit 3a, respectively, and transmits the at least one second seam region display signal to the at least one secondary display driving board 4 coupled thereto, respectively, at the same time; and then, the secondary display driving board 4 transmits the respective second seam region display data to the second seam display units 3b coupled thereto. In this way, the plurality of display modules 1 and the plurality of seam display units (the first seam display units 3a and the second seam display units 3b) may display images simultaneously, thereby displaying an image at the tiled position of two adjacent display modules 1, realizing the display of a complete image on the entire tiled screen, and optimizing the display effect.

In a case where the number of the display modules 1 included in the tiled display apparatus is large, for example, in a case where the number of display modules 1 is greater than six, the number of the seam display units included is also large. In the above embodiments, by providing at least one secondary display driving board 4, and by arranging that the second seam region display signal is transmitted to the secondary display driving board 4, and then the secondary display driving board 4 transmits the groups of seam region display data to the second seam display units 3b coupled thereto respectively, it may be possible to lower the signal processing and signal transmission burden of the main display driving board 2, and reduce the number of transmission interfaces required on the main display driving board 2. As such, the normal display of the tiled display apparatus may be ensured, and the cost may be reduced.

In some embodiments, the number of seam display units controlled by the main display driving board 2 and the number of seam display units controlled by each secondary display driving board 4 need to be configured in a way that the signal processing burden is reasonably allocated among the display driving boards and the number of interfaces required on each display driving board is reasonable. For example, the number of the first seam display units 3*a* is less than or equal to seven, and the number of the second seam display units 3*b* coupled to a single secondary display driving board 4 is less than or equal to seven. With this arrangement, the number of seam display units controlled by the main display driving board 2 and the number of seam display units controlled by each secondary display driving board 4 may be reasonably set, so that the signal processing burdens of the main display driving board 2 and each secondary display driving board 4 are all within a reasonable range. In addition, the number of interfaces required on the main display driving board 2 and the secondary display driving board 4 are relatively reasonable. As a result, the normal operation of the main display driving board 2 and the secondary display driving board 4 may be ensured, and the cost may be saved.

In some embodiments, the first seam display unit(s) 3*a* are closer to the main display driving board 2 than the second seam display unit(s) 3*b*.

That is, the main display driving board 2 is coupled to the at least one first seam display unit 3*a* proximate to the main display driving board 2 among the plurality of seam display units. In this way, a length of the coupling wire may be reduced, and the regularity of a plurality of coupling wires may be improved, which may facilitate the coupling of the main display driving board 2 to the first seam display units 3*a*, and reduce the difficulty of assembling the tiled display apparatus.

In some embodiments, each secondary display driving board 4 is coupled to at least one second seam display unit 3*b* proximate to the secondary display driving board 4 among the second seam display units 3*b*. In this way, the length of the coupling wire may be reduced, which may prevent the plurality of coupling wires from being too long and messy, and reduce the assembling difficulty.

In some embodiments, the main display driving board 2 is disposed on the display module 1 to which the first stage system board 11, which is coupled to the main display driving board 2, belongs. Each secondary display driving board 4 is disposed on any one of the display modules 1 adjacent to the at least one second seam display unit 3*b*, which is coupled to the secondary display driving board 4.

For example, as shown in FIGS. 1 to 3, the main display driving board 2 is disposed on the display module 1 numbered "A" to which the first stage system board 11 belongs. As shown in FIG. 2, the secondary display driving board 4 is provided on the display module 1 numbered "C", and the display module 1 is the display module 1 adjacent to the six second seam display units 3*b* that are coupled to the secondary display driving board 4.

By arranging the positions of the main display driving board 2 and the secondary display driving board 4 in the above manner, it may be more convenient to couple the main display driving board 2 to the first stage system board 11, and couple the secondary display driving board 4 to the second seam display units 3*b* controlled by the secondary display driving board 4. Moreover, the length of the coupling wire may be reduced, and the assembly difficulty may be reduced.

In some embodiments, the seam display units 3 are mini light-emitting diode (mini LED) display units.

Figure 5:
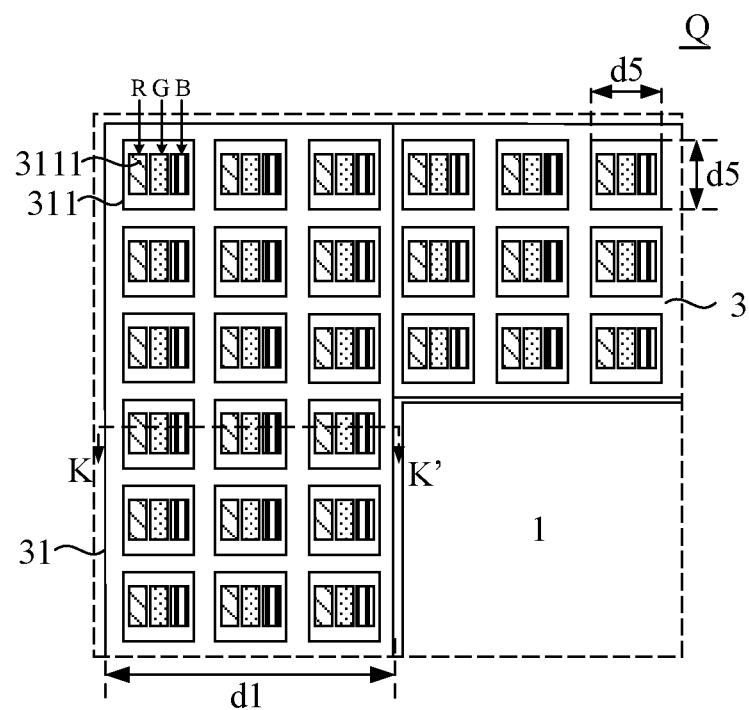
FIG. 5 is an enlarged view of a region Q in FIG. 1.
Figure 6:
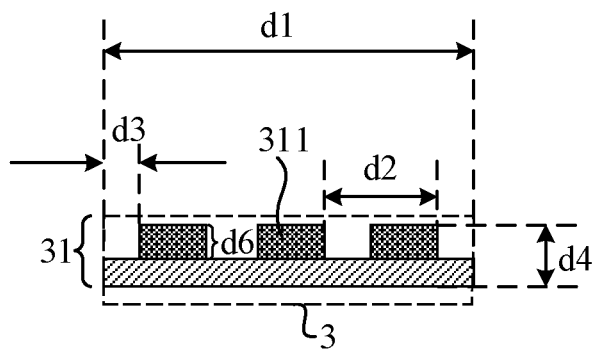
FIG. 6 is a sectional view taken along a section line KK' in FIG. 5.

In some examples, as shown in FIGS. 5 and 6, the seam display unit 3 includes a light plate 31. For example, a width d1 of the light plate 31 is 3.9 mm and a thickness d4 of the light plate 31 is 0.8 mm. The light plate 31 includes a plurality of pixels 311, and the plurality of pixels 311 are arranged in an array. For example, in FIG. 1, the light plate 31 of the seam display unit 3 arranged horizontally includes three rows of pixels 311, and the number of pixels 311 included therein is (960×3), which equals to 2,880. The light plate 31 of the seam display unit 3 arranged vertically includes three columns of pixels 311, and the number of pixels 311 included therein is (543×3), which equals to 1,629.

As shown in FIG. 5, each pixel 311 includes three mini LED chips 3111, which are configured to emit red, green, and blue light (i.e. RGB), respectively. For example, as shown in FIGS. 5 and 6, the size of a single pixel 311 is: 1 mm×1 mm×0.65 mm. That is, a length d5 and a width d5 of the pixel 311 are both 1 mm, and a height d6 thereof is 0.65 mm. A distance between two adjacent pixels 311 at the same position thereof is 1.26 mm, and a distance d3 between the outermost pixel 311 and the edge of the light plate 31 is 0.2 mm.

Figure 7B:
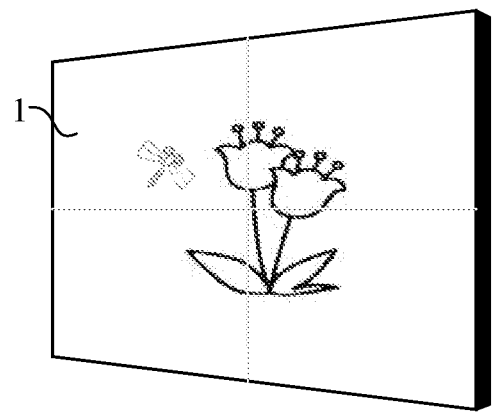
FIG. 7B is a diagram of display effect of the tiled display apparatus, in accordance with some embodiments.

The mini LED display unit has a small pixel spacing and a small pixel size. In a case where the display module 1 is a liquid crystal display module, the difference between the pixel spacing of the mini LED display unit and the pixel spacing of the liquid crystal display module is small (as shown in FIG. 6, the display module 1 includes a plurality of pixels 311, and each pixel 311 includes three sub-pixels); therefore, the pixel alignment accuracy at the boundary between the mini LED display unit and the liquid crystal display module is very high, and the problem of inaccurate alignment is unlikely to occur, making the displayed image more complete. In addition, corresponding signals of the plurality of seam display units 3 and the display modules 1 are all divided and controlled by the main display driving board 2, so that the main display driving board 2 may be able to adjust the display effect at the boundaries between the display modules 1 and the seam display units. For example, the main display driving board 2 may blur the edges of the images, so as to weaken the boundaries between the display modules 1 and the seam display units. In this way, the seams in the image displayed by the entire tiled screen may be less obvious to the human eye, thereby improving the display effect. For example, the display effect of the tiled display apparatus provided by the present disclosure may be as shown in FIG. 7B, from which it can be seen that the seams are not obvious in the entire image, and the displayed image is more complete with a good visual effect.

In some examples, the main display driving board 2 is further configured to, according to a resolution of the display module 1, a resolution of the seam display unit, and the main screen region display signal and seam region display signal acquired according to the display signal, match the resolution of an image characterized by the main screen region display data included in the main screen region display signal with the resolution of the display module 1, and match the resolution of an image characterized by the seam region display data included in the seam region display signal with the resolution of the seam display unit, so as to optimize the display effect.

In the seam display units provided by some embodiments of the present disclosure, the plurality of display modules 1, the plurality of first seam display units 3a and the plurality of second seam display units 3b are all controlled by the main display driving board 2 (in a direct or indirect manner) to display images. In some embodiments, the main display driving board 2 is further configured to set the display parameters of the display modules 1, the plurality of first seam display units 3a, and the plurality of second seam display units 3b, so that the display modules 1 and the plurality of seam display units have similar visual effects or the same visual effect. For example, the display parameters include brightness, chromaticity, contrast and the like. In this way, the image displayed by the entire tiled screen may have a display effect of uniform brightness and uniform chromaticity in all the regions.

In some embodiments, the seam display unit further includes a driving board. The driving board is configured to drive the light plate to display an image. For example, the driving board is connected to the light plate by a flexible printed circuit (FPC). As for the first seam display unit 3a, the driving board thereof is coupled to the main display driving board 2, and is configured to receive the first seam region display signal transmitted by the main display driving board 2, and control the light plate to display an image according to the first seam region display signal. Alternatively, as for the second seam display unit 3b, the driving board thereof is coupled to the secondary display driving board 4, and is configured to receive the second seam region display signal transmitted by the secondary display driving board 4, and control the light plate to display an image according to the second seam region display signal.

In some embodiments, as for the tiled display apparatus as shown in FIGS. 2 and 3, that is, in a case where the tiled display apparatus further includes at least one first seam display unit 3a, at least one second seam display unit 3b and at least one secondary display driving board 4, as shown in FIG. 4, the main display driving board 2 further includes at least one second output interface 23 and at least one third output interface 24.

The at least one second output interface 23 is respectively coupled to the at least one first seam display unit 3a. The second output interface 23 is configured to transmit the first seam region display signal acquired according to the display signal to the first seam display unit 3a coupled thereto. For example, the second output interface 23 is a serial peripheral interface (SPI).

The at least one third output interface 24 is respectively coupled to the at least one secondary display driving board 4. The third output interface 24 is configured to transmit the second seam region display signal acquired according to the display signal to the secondary display driving board 4 coupled thereto. The third output interface 24 is a HDMI.

In some embodiments, the secondary display driving board 4 includes a seam display signal input interface and at least one seam display data output interface.

The seam display signal input interface of the secondary display driving board 4 is coupled to the third output interface 24 of the main display driving board 2, and the seam display signal input interface is configured to receive the second seam region display signal transmitted by the main display driving board 2. For example, the seam display signal input interface is a HDMI.

The at least one seam display data output interface is respectively coupled to the at least one second seam display unit 3b, and the seam display data output interface is configured to transmit the at least one group of second seam region display data included in the second seam region display signal to the second seam display unit 3b coupled thereto, respectively. For example, the second output interface is a SPI.

In some embodiments, as shown in FIGS. 1 to 3, each display module 1 further includes a timing controller 12. The timing controller 12 is coupled to the system board 11.

The system board 11 is further configured to output a timing control signal and a RGB data signal according to the extracted main screen region display data. In some examples, the system board 11 includes a data output interface. The data output interface is configured to transmit the timing control signal and the RGB data signal to a timing controller 12. For example, the data output interface is a low-voltage differential signaling (LVDS) interface.

The timing controller is configured to receive the timing control signal and the RGB data signal, and control the display module to display an image according to the timing control signal and the RGB data signal.

For example, the display module 1 further includes a gate driving circuit and a data driving circuit. The gate driving circuit is coupled to the timing controller 12, and is further coupled to gate lines in the display screen. The data driving circuit is coupled to the timing controller 12, and is further coupled to data lines in the display screen. The timing controller is configured to receive the timing control signal and the RGB data signal, and output signals to control the gate driving circuit and the data driving circuit to input certain voltages to the display screen at a certain time according to the timing control signal and the RGB data signal, so as to control the display screen to display the image.

In some embodiments, as shown in FIGS. 1 to 3, the tiled display apparatus further includes a first power circuit 5. The first power circuit 5 is coupled to the main display driving board 2. The first power circuit 5 is configured to provide power to the main display driving board 2.

In some embodiments, as shown in FIGS. 1 to 3, each display module 1 further includes a second power circuit 13. The second power circuit 13 is coupled to the system board 11. The second power circuit 13 is configured to provide power to the system board 11 coupled thereto.

The system board 11 achieves the extraction of the main screen region display data and the transmission of the main screen region display signal according to a received power, and transmits the received power to other electronic components in the display module 1, such as the timing controller 12, so as to provide power for the other electronic components to ensure normal operation.

In some embodiments, as shown in FIGS. 1 to 3, in the case where the tiled display apparatus further includes at least one secondary display driving board 4, the tiled display apparatus further includes at least one third power circuit 6. The at least one third power circuit 6 is respectively coupled to the at least one secondary display driving board 4. The third power circuit 6 is configured to provide power to the secondary display driving board 4 coupled thereto.

In some examples, the first power circuit 5 is further coupled to the at least one first seam display unit 3a, such that the first power circuit 5 provides power to the at least one first seam display unit 3a. Each third power circuit 6 is further coupled to at least one second seam display unit 3b, which is controlled by the secondary display driving board 4 coupled to the third power circuit 6, so that the third power circuit 6 provides power to the at least one second seam display unit 3b.

Figure 8:
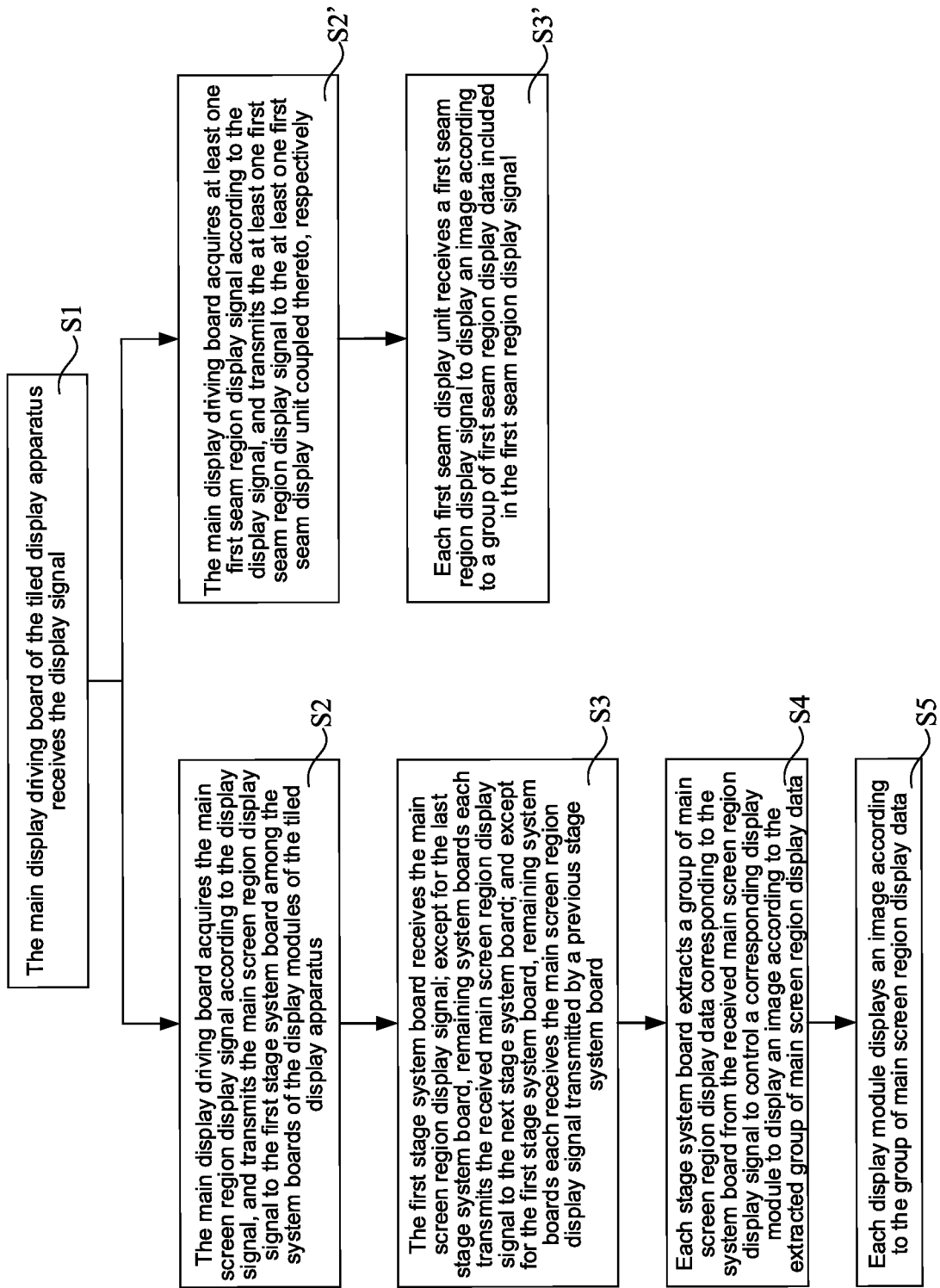
FIG. 8 is a flow diagram of a tiled display control method, in accordance with some embodiments.
Figure 9:
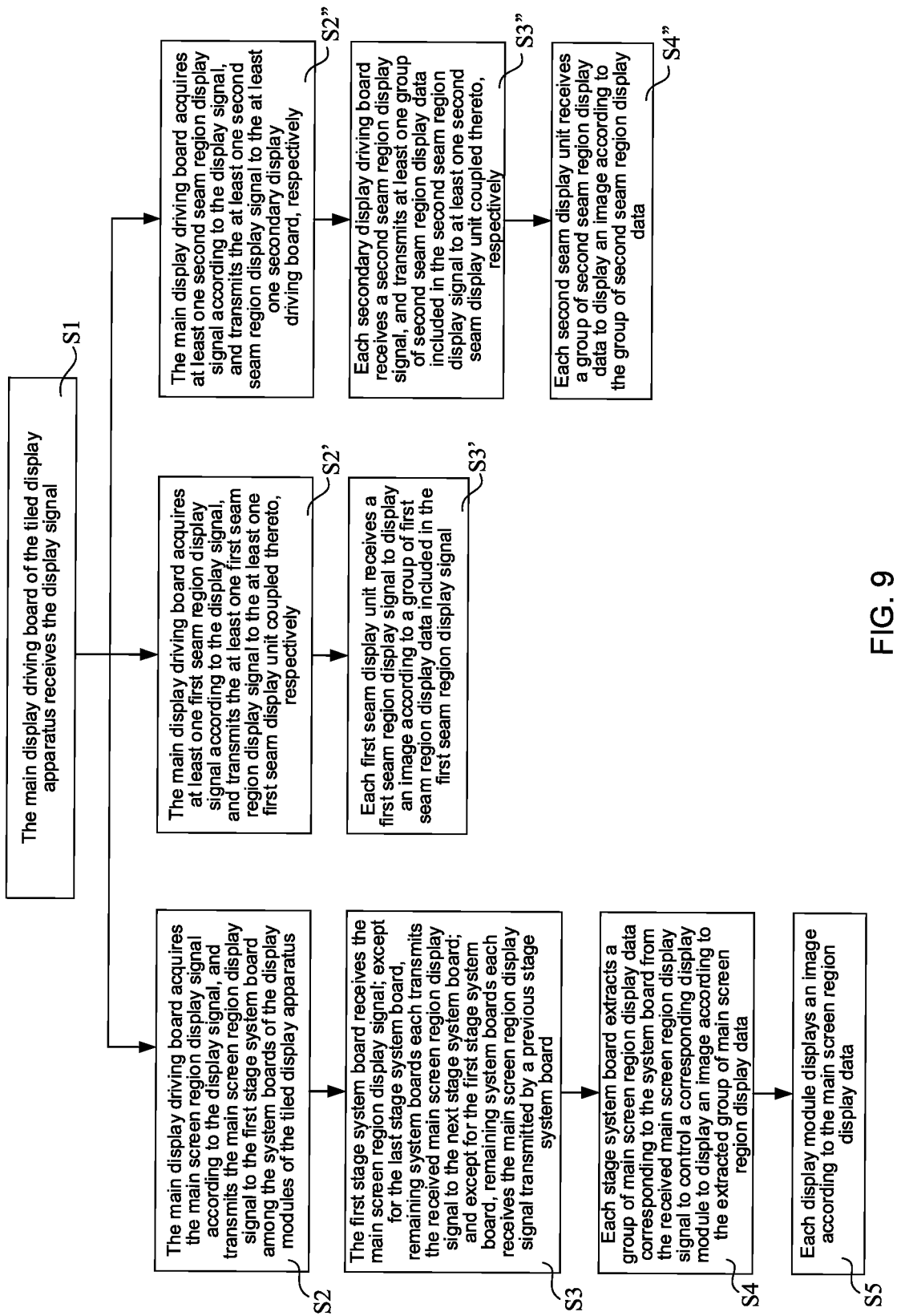
FIG. 9 is a flow diagram of another tiled display control method, in accordance with some embodiments.

Some embodiments of the present disclosure further provides a tiled display control method applied to the tiled display apparatus as provided by the embodiments of the present disclosure. As shown in FIGS. 8 and 9, the tiled display control method includes steps as followings.

In S1, the main display driving board 2 of the tiled display apparatus receives the display signal.

In S2, the main display driving board 2 acquires the main screen region display signal according to the display signal, and transmits the main screen region display signal to the first stage system board 11 among the system boards 11 of the display modules 1 of the tiled display apparatus. The main screen region display signal includes a plurality of groups of main screen region display data, and a group of main screen region display data is display data required for a display module to display an image.

In some embodiments, acquiring, by the main display driving board 2, the main screen region display signal according to the display signal, includes: dividing, by the main display driving board 2, the display signal according to the number of the plurality of system boards 11, so as to obtain the main screen region display signal including the plurality of groups of main screen region display data.

In S3, the first stage system board 11 receives the main screen region display signal transmitted by the main display driving board 2; except for the last stage system board 11, remaining system boards each transmits the received main screen region display signal to the next stage system board 11; and except for the first stage system board 11, remaining system boards 11 each receives the main screen region display signal transmitted by a previous stage system board 11.

In S4, each stage system board 11 extracts a group of main screen region display data corresponding to the system board from the received main screen region display signal to control a corresponding display module 1 to display an image according to the extracted group of main screen region display data.

In S5, each display module displays an image according to the group of main screen region display data.

In the above tiled display control method, the main display driving board 2 acquires a main screen region display signal according to the display signal, and transmits the main screen region display signal to the first stage system board 11. Through transmission of the main screen region display signal from the first stage system board 11 to the penultimate stage system board 11, the transmission of the main screen region display signal among the system boards 11 from stage to stage is realized. In addition, each stage system board 11 extracts corresponding main screen region display data from the received main screen region display signal to control a corresponding display module 1 to display an image according to the extracted main screen region display data. As a result, all the display modules 1 included in the tiled display apparatus display corresponding sub-images, thereby allowing the entire tiled screen to form a complete image.

In some embodiments, as shown in FIGS. 2 and 3, in a case where the tiled display apparatus further includes a plurality of seam display units 3, and the plurality of seam display units 3 include at least one first seam display unit 3a, as shown in FIGS. 8 and 9, the tiled display control method further includes steps as followings.

In S2', the main display driving board 2 acquires at least one first seam region display signal according to the display signal, and transmits the at least one first seam region display signal to the at least one first seam display unit 3a coupled thereto, respectively. Each first seam region display signal includes a group of first seam region display data, and a group of first seam region display data is display data required for a first seam display unit 3a to display an image.

In S3', each first seam display unit receives a first seam region display signal to display an image according to a group of first seam region display data included in the first seam region display signal.

In a case where the tiled display apparatus provided by the embodiments of the present disclosure further includes a plurality of seam display units 3a, the main display driving board 2 acquires the main screen region display signal and the at least one first seam region display signal simultaneously according to the display signal, and transmits the main screen region display signal to the first stage system board 11 and transmits the at least one first seam region display signal to the at least one first seam display unit 3a coupled thereto, respectively, at the same time. In this way, the plurality of display modules 1 and the plurality of seam display units may display images simultaneously, thereby displaying an image at the tiled position of two adjacent display modules 1, realizing the display of a complete image on the entire tiled screen, and optimizing the display effect.

In some embodiments, as shown in FIG. 3, the plurality of seam display units further include at least one second seam display unit 3b, and the tiled display apparatus further includes at least one secondary display driving board 4. As shown in FIG. 9, the tiled display control method further includes steps as followings.

In S2", the main display driving board 2 acquires at least one second seam region display signal according to the display signal, and transmits the at least one second seam region display signal to the at least one secondary display driving board 4, respectively. Each second seam region display signal includes at least one group of second seam region display data, and a group of second seam region display data is display data required for a second seam display unit 3b to display an image.

In S3", each secondary display driving board 4 receives a second seam region display signal, and transmits at least one group of second seam region display data included in the second seam region display signal to at least one second seam display unit 3b coupled thereto, respectively.

In S4", each second seam display unit 3b receives a group of second seam region display data to display an image according to the group of second seam region display data.

In a case where the tiled display apparatus provided by the embodiments of the present disclosure further includes a plurality of seam display units, and the plurality of seam display units include the first seam display unit(s) 3a and the second seam display unit(s) 3b, the main display driving board 2 acquires the main screen region display signal, the at least one first seam region display signal and the at least one second seam region display signal simultaneously according to the display signal, and transmits the main screen region display signal to the first stage system board 11, transmits the at least one first seam region display signal to the at least one first seam display unit 3a, respectively, and transmits the at least one second seam region display signal to the at least one secondary display driving board 4 coupled thereto, respectively, at the same time; and then, the secondary display driving board 4 transmits groups of the second seam region display data to the second seam display units 3b coupled thereto, respectively. In this way, the plurality of display modules 1 and the plurality of seam display units (the first seam display unit(s) 3a and the second seam display unit(s) 3b) may display images simultaneously, thereby displaying an image at the tiled position of two adjacent display modules 1, realizing the display of a complete image on the entire tiled screen, and optimizing the display effect.

In some embodiments, the tiled display control method further includes: setting, by the main display driving board 2, display parameters of the display modules 1, the plurality of first seam display units 3a, and the plurality of second seam display units 3b, so that the display modules 1 and the plurality of seam display units have similar visual effects or a same visual effect. For example, the display parameters include brightness, chromaticity, contrast and the like. In this way, the image displayed by the entire tiled screen may have a display effect of uniform brightness and uniform chromaticity in all the regions.

Some embodiments of the present disclosure further provide a computer-readable storage medium. The computer-readable storage medium has stored thereon computer program instructions that, when executed on a processor, cause the processor to perform one or more steps of the tiled display control method provided by the embodiments of the present disclosure.

For example, the computer-readable storage medium includes, but is not limited to, a magnetic storage device (e.g., a hard disk, a floppy disk or a magnetic tape), an optical disk (e.g., a compact disk (CD) or a digital versatile disk (DVD)), a smart card, a flash memory device (e.g., an erasable programmable read-only memory (EPROM), a card, a stick or a key driver). Various computer-readable storage media described in the embodiments of the present disclosure may represent one or more devices and/or other machine-readable storage media for storing information. The term "machine-readable storage media" include, but are not limited to, wireless channels and various other media capable of storing, containing and/or carrying instructions and/or data.

Some embodiments of the present disclosure further provide a computer program product. The computer program product includes computer program instructions that, when executed on a computer, cause the computer to perform one or more steps in the tiled display control method provided by the embodiments of the present disclosure.

Some embodiments of the present disclosure further provide a computer program. When executed on a computer, the computer program causes the computer to perform one or more steps in the tiled display control method provided by the embodiments of the present disclosure.

The computer-readable storage medium, the computer program product and the computer program have the same beneficial effects as the tiled display control method provided in the embodiments of the present disclosure, and details will not be repeated here.

The foregoing descriptions are merely specific implementations of the present disclosure, but the protection scope of the present disclosure is not limited thereto. Any person skilled in the art could conceive of changes or replacements within the technical scope of the present disclosure, which shall all be included in the protection scope of the present disclosure. Therefore, the protection scope of the present disclosure shall be subject to the protection scope of the claims.

What is claimed is:

1. A tiled display apparatus, comprising:
a plurality of display modules that are tiled together, each display module including a system board, and system boards of the display modules being cascaded in sequence;
a plurality of seam display units, each seam display unit being disposed between two adjacent display modules of the plurality of display modules, the plurality of seam display units including at least one first seam display unit; and
a main display driving board being coupled to a first stage system board among the system boards cascaded in sequence and the at least one first seam display unit, wherein
the main display driving board is configured to receive a display signal, acquire a main screen region display signal according to the display signal, and transmit the main screen region display signal to the first stage system board; the main screen region display signal includes a plurality of groups of main screen region display data, and a group of main screen region display data is display data required for a display module to display an image;
the system board is configured to receive the main screen region display signal, and extract a group of main screen region display data corresponding to the system board from the main screen region display signal to control a display module to which the system board belongs to display an image according to the extracted group of main screen region display data; except for a last stage system board, remaining system boards are each further configured to transmit the received main screen region display signal to a next stage system board;
the main display driving board is further configured to acquire at least one first seam region display signal according to the display signal, and transmit the at least one first seam region display signal to the at least one first seam display unit, respectively; each first seam region display signal includes a group of first seam region display data, and a group of first seam region display data is display data required for a first seam display unit to display an image; and
each first seam display unit is configured to receive a first seam region display signal to display an image according to a group of first seam region display data included in the first seam region display signal.

2. The tiled display apparatus according to claim 1, wherein the main display driving board is further configured to divide the display signal according to a number of the plurality of system boards, so as to obtain the main screen region display signal including the plurality of groups of main screen region display data.

3. The tiled display apparatus according to claim 1, wherein the plurality of seam display units further include at least one second seam display unit;
the tiled display apparatus further comprises at least one secondary display driving board, wherein
the at least one secondary display driving board is coupled to the main display driving board, and each secondary display driving board is coupled to one or more second seam display units;
the main display driving board is further configured to acquire at least one second seam region display signal according to the display signal, and transmit the at least one second seam region display signal to the at least one secondary display driving board, respectively; each second seam region display signal includes at least one group of second seam region display data, and a group of second seam region display data is display data required for a second seam display unit to display an image;

each secondary display driving board is configured to receive a second seam region display signal and transmit at least one group of second seam region display data included in the second seam region display signal to one or more second seam display units coupled thereto, respectively; and each second seam display unit is configured to receive a group of second seam region display data to display an image according to the group of second seam region display data.

4. The tiled display apparatus according to claim 3, wherein the first seam display unit is closer to the main display driving board than the second seam display unit.

5. The tiled display apparatus according to claim 3, wherein a number of first seam display units is less than or equal to seven; and a number of second seam display units coupled to the secondary display driving board is less than or equal to seven.

6. The tiled display apparatus according to claim 1, wherein the seam display units are mini light-emitting diode (LED) display units.

7. The tiled display apparatus according to claim 1, wherein the main display driving board is disposed on a display module to which the first stage system board belongs.

8. The tiled display apparatus according to claim 7, wherein the tiled display apparatus further comprises at least one secondary display driving board, each secondary display driving board is disposed on any one of display modules adjacent to at least one second seam display unit, which is coupled to the secondary display driving board.

9. The tiled display apparatus according to claim 1, wherein the main display driving board includes:

a display signal input interface, the display signal input interface being configured to receive the display signal; and a first output interface coupled to the first stage system board, the first output interface being configured to transmit the main screen region display signal acquired according to the display signal to the first stage system board.

10. The tiled display apparatus according to claim 9, further comprising at least one second seam display unit and at least one secondary display driving board, the main display driving board further including:

at least one second output interface, wherein the at least one second output interface is respectively coupled to the at least one first seam display unit, and a second output interface is configured to transmit a first seam region display signal acquired according to the display signal to a first seam display unit coupled thereto; and at least one third output interface, wherein the at least one third output interface is respectively coupled to the at least one secondary display driving board, and a third output interface is configured to transmit a second seam region display signal acquired according to the display signal to a secondary display driving board coupled thereto.

11. The tiled display apparatus according to claim 1, wherein each display module further includes a timing controller, the timing controller is coupled to the system board;

the system board is configured to output a timing control signal and a red-green-blue (RGB) data signal according to the extracted main screen region display data; and the timing controller is configured to receive the timing control signal and the RGB data signal, and control the display module to display an image according to the timing control signal and the RGB data signal.

12. The tiled display apparatus according to claim 1, further comprising a first power circuit, wherein the first power circuit is coupled to the main display driving board, and the first power circuit is configured to provide power to the main display driving board.

13. The tiled display apparatus according to claim 12, wherein each display module further includes a second power circuit, the second power circuit is coupled to the system board, and the second power circuit is configured to provide power to the system board coupled thereto.

14. The tiled display apparatus according to claim 12, wherein the tiled display apparatus further comprises at least one secondary display driving board, the tiled display apparatus further comprises at least one third power circuit;

the at least one third power circuit is respectively coupled to the at least one secondary display driving board, and a third power circuit is configured to provide power to a secondary display driving board coupled thereto.

15. A tiled display control method applied to a tiled display apparatus, the tiled display apparatus comprising a plurality of display modules that are tiled together and a main display driving board, each display module including a system board, system boards of the display modules being cascaded in sequence, the main display driving board being coupled to a first stage system board among the system boards cascaded in sequence, the tiled display control method comprising:

receiving, by the main display driving board of the tiled display apparatus, a display signal;

acquiring, by the main display driving board, a main screen region display signal according to the display signal; and transmitting, by the main display driving board, the main screen region display signal to the first stage system board among the system boards of the display modules of the tiled display apparatus, wherein the main screen region display signal includes a plurality of groups of main screen region display data, and a group of main screen region display data is display data required for a display module to display an image;

receiving, by the first stage system board, the main screen region display signal transmitted by the main display driving board; transmitting, by each of remaining system boards except for a last stage system board, the received main screen region display signal to a next stage system board;

receiving, by each of remaining system boards except for the first stage system board, the main screen region display signal transmitted by a previous stage system board; and extracting, by each system board, a group of main screen region display data corresponding to the system board from the received main screen region display signal to control a corresponding display module to display an image according to the extracted group of main screen region display data.

16. The tiled display control method according to claim 15, wherein the tiled display apparatus further includes a plurality of seam display units, and the plurality of seam display units include at least one first seam display unit;

the tiled display control method further comprises:

acquiring, by the main display driving board, at least one first seam region display signal according to the display signal; and transmitting, by the main display driving board, the at least one first seam region display signal to the at least one first seam display unit coupled thereto, respectively; wherein each first seam region display signal includes a group of first seam region display data, and a group of first seam region display data is display data required for a first seam display unit to display an image; and receiving, by each first seam display unit, a first seam region display signal to display an image according to a group of first seam region display data included in the first seam region display signal.

17. The tiled display control method according to claim 16, wherein the plurality of seam display units further include at least one second seam display unit, and the tiled display apparatus further includes at least one secondary display driving board;

the tiled display control method further comprises:

acquiring, by the main display driving board, at least one second seam region display signal according to the display signal; and transmitting, by the main display driving board, the at least one second seam region display signal to the at least one secondary display driving board, respectively; wherein each second seam region display signal includes at least one group of second seam region display data, and a group of second seam region display data is display data required for a second seam display unit to display an image;

receiving, by each secondary display driving board, a second seam region display signal; and transmitting, by the secondary display driving board, at least one group of second seam region display data included in the second seam region display signal to at least one second seam display unit coupled thereto, respectively; and receiving, by each second seam display unit, a group of second seam region display data to display an image according to the group of second seam region display data.

18. A non-transitory computer-readable storage medium, having stored thereon computer program instructions that, when executed on a processor, cause the processor to perform one or more steps of the tiled display control method according to claim 15.

19. The tiled display control method according to claim 15, wherein acquiring, by the main display driving board, the main screen region display signal according to the display signal, includes:

dividing, by the main display driving board, the display signal according to the number of the plurality of system boards, so as to obtain the main screen region display signal including the plurality of groups of main screen region display data.

* * * * *